US005706045A

United States Patent [19]
Inoue

[11] Patent Number: 5,706,045
[45] Date of Patent: Jan. 6, 1998

[54] IMAGE DATA RESOLUTION ENHANCING APPARATUS

[75] Inventor: Nobuhiro Inoue, Tokyo, Japan

[73] Assignee: Kabushiki Kaisha Toshiba, Kawasaki, Japan

[21] Appl. No.: 709,049

[22] Filed: Sep. 6, 1996

Related U.S. Application Data

[63] Continuation of Ser. No. 186,862, Jan. 27, 1994, abandoned.

[30] Foreign Application Priority Data

Jan. 28, 1993 [JP] Japan .................... 5-012738
Jun. 14, 1993 [JP] Japan .................... 5-141787

[51] Int. Cl.$^6$ .................... B41J 2/36; B41J 2/355
[52] U.S. Cl. .................... 347/211; 347/195
[58] Field of Search .................... 347/211, 183, 347/195; 400/120.15, 120.07

[56] References Cited

U.S. PATENT DOCUMENTS 4,032,977  6/1977  Liao ................... 358/280
4,819,008  4/1989  Nagato et al. ................... 346/76

FOREIGN PATENT DOCUMENTS

0476863A1  3/1992  European Pat. Off.
0266655    1/1991  Japan ................... 347/183
4047471    2/1992  Japan.

OTHER PUBLICATIONS

Tsumura et al., "A Bi-CMOS Thermal Head Intelligent Driver with Density Controllers for Fulltone Rendition Printers", May 4-7, 272-75 Proceedings of the IEEE 1987 Custom Integrated Circuits Conference.
European Search Report, May 10, 1994.

*Primary Examiner*—Huan H. Tran
*Attorney, Agent, or Firm*—Finnegan, Henderson, Farabow, Garrett & Dunner, L.L.P.

[57] ABSTRACT

In a thermal printing apparatus, three consecutive image data items in the main scanning direction is sequentially extracted. When all the three image data items are at level 0 (indicating that no dot is printed) and at level 1 (indicating that a dot is printed), a printing density is determined to be 0 (indicating that no dot is printed) and 3 (indicating that a dot of the highest printing density is printed), respectively. When one of the three image data items is at level 1, the printing density is determined to be 1 (indicating that a dot of the lowest printing density is printed) when the printing density of the preceding printed pixel is any value other than 0. When one or two of the three image data items is or are at level 1, the printing density is determined to be 1 or 2 (indicating that a dot of an intermediate printing density is printed) according to the printing density of the preceding printed pixel. Thus, the printing apparatus is capable of printing image data without the degradation of the image quality, even when the image data whose resolution in the main scanning direction is higher than (e.g., three times as high as) that inherent to the apparatus is supplied.

11 Claims, 14 Drawing Sheets

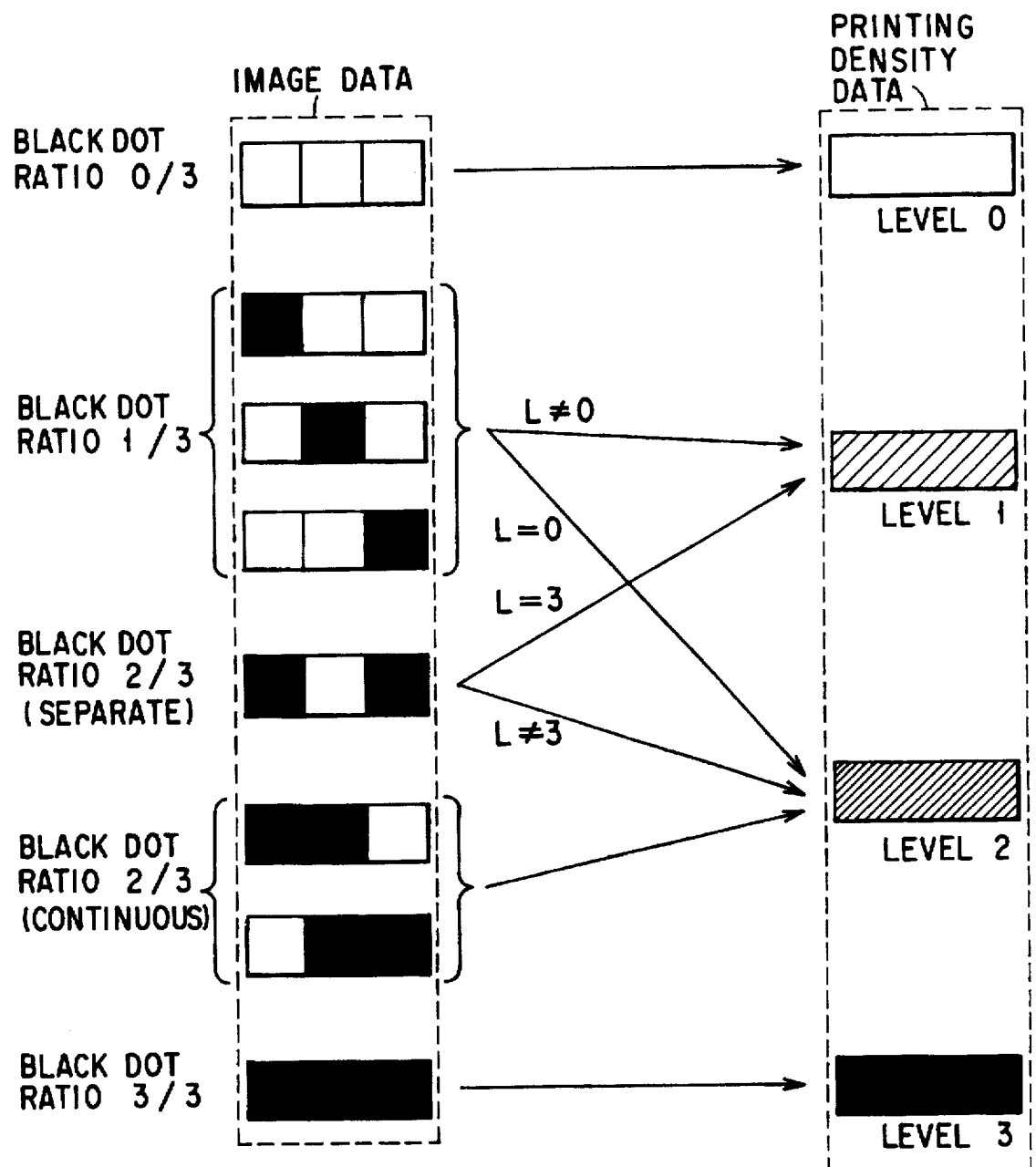
F I G. 4

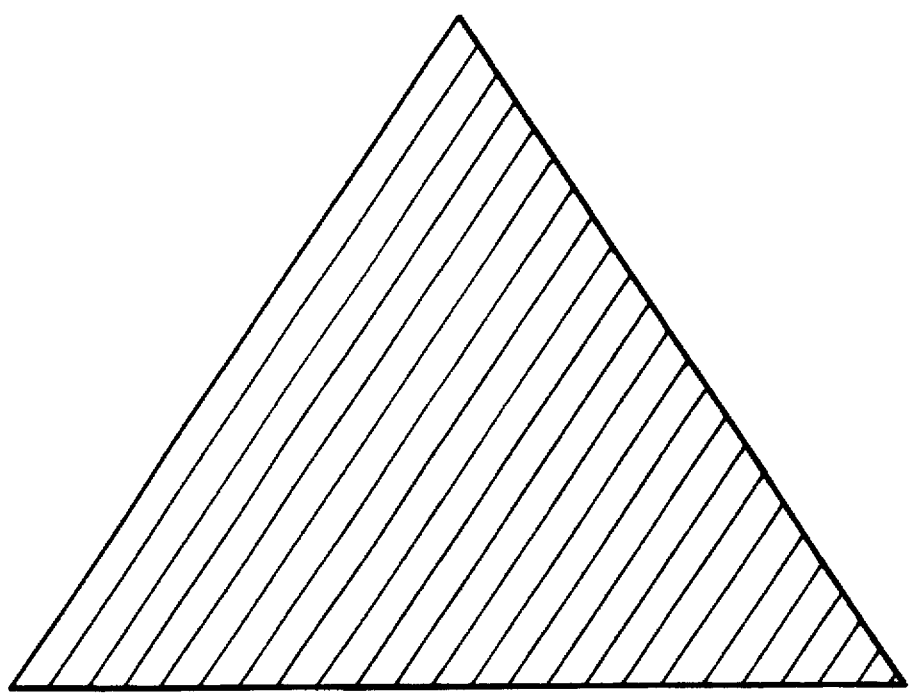
F I G. 5A
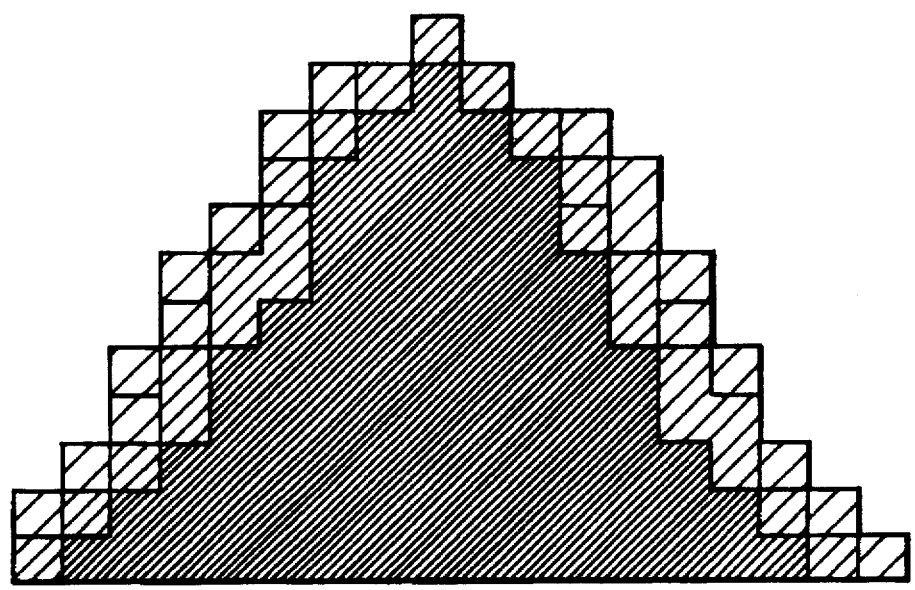
F I G. 5B

F I G. 6A
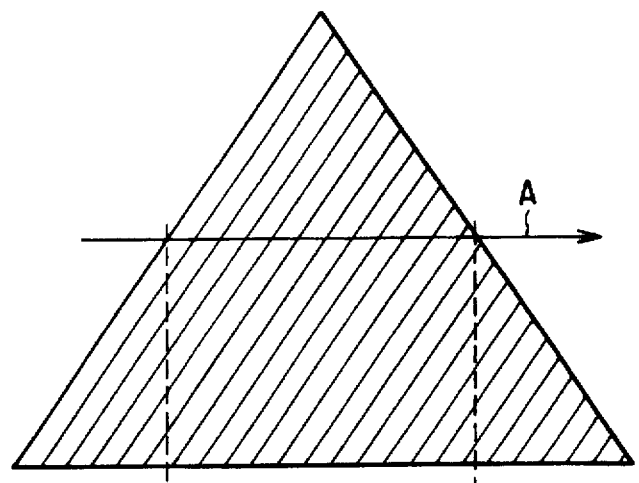
F I G. 6B
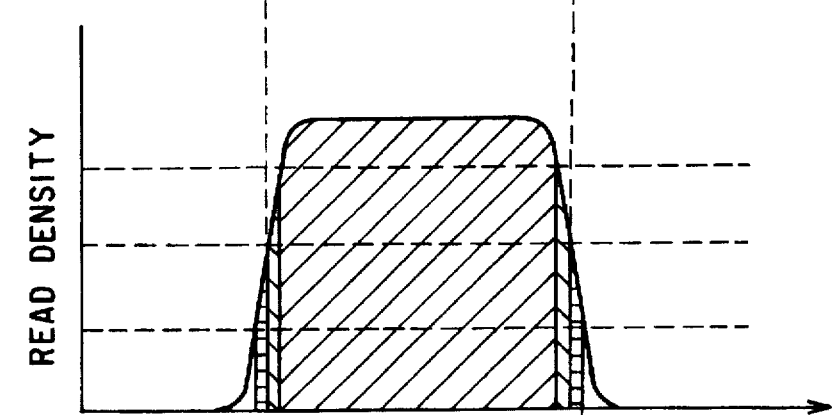
F I G. 6C
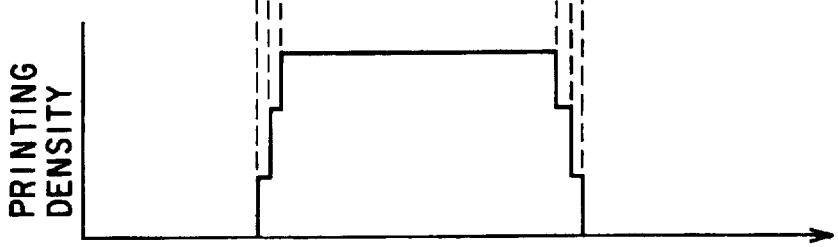

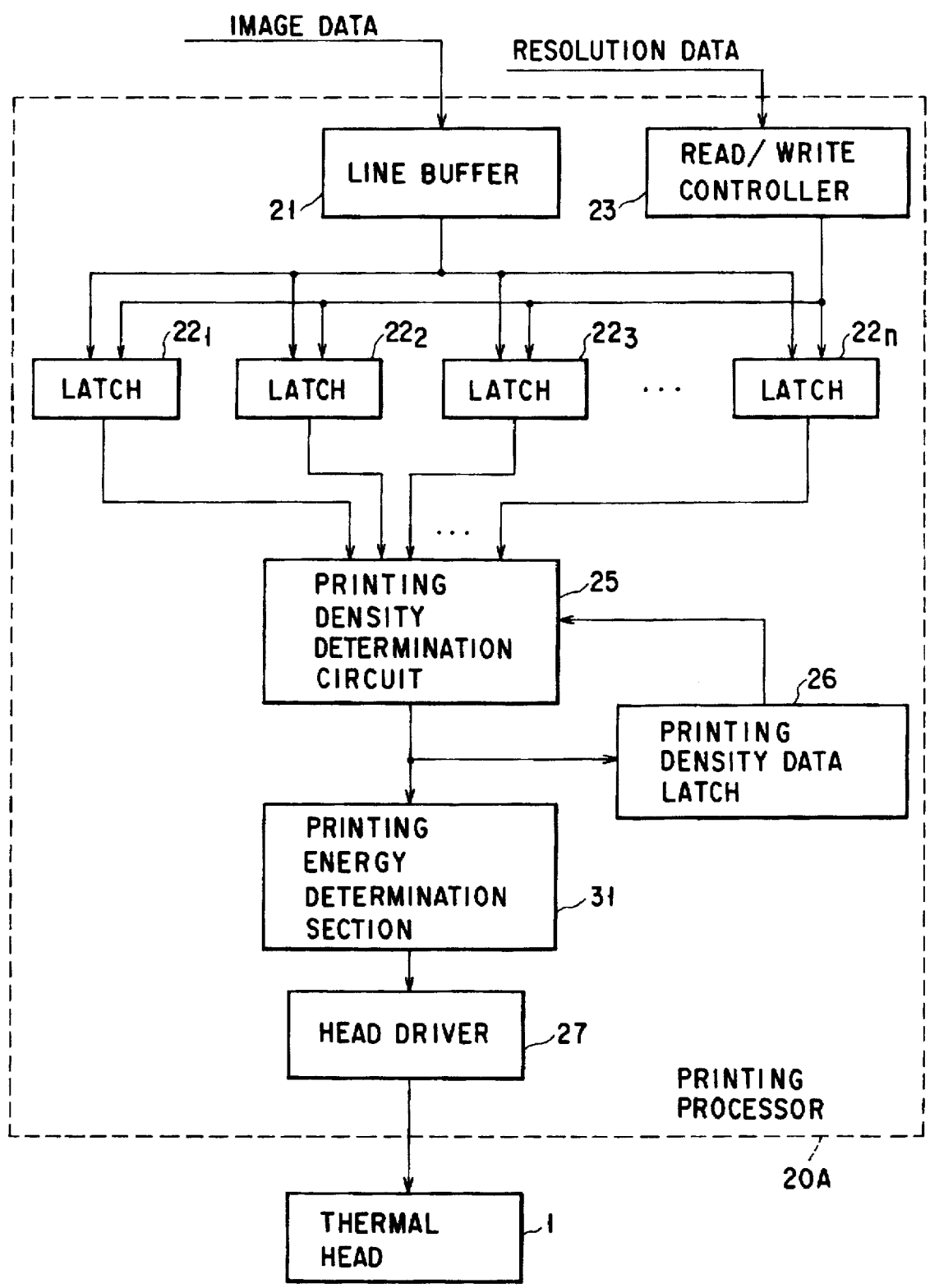
F I G. 7

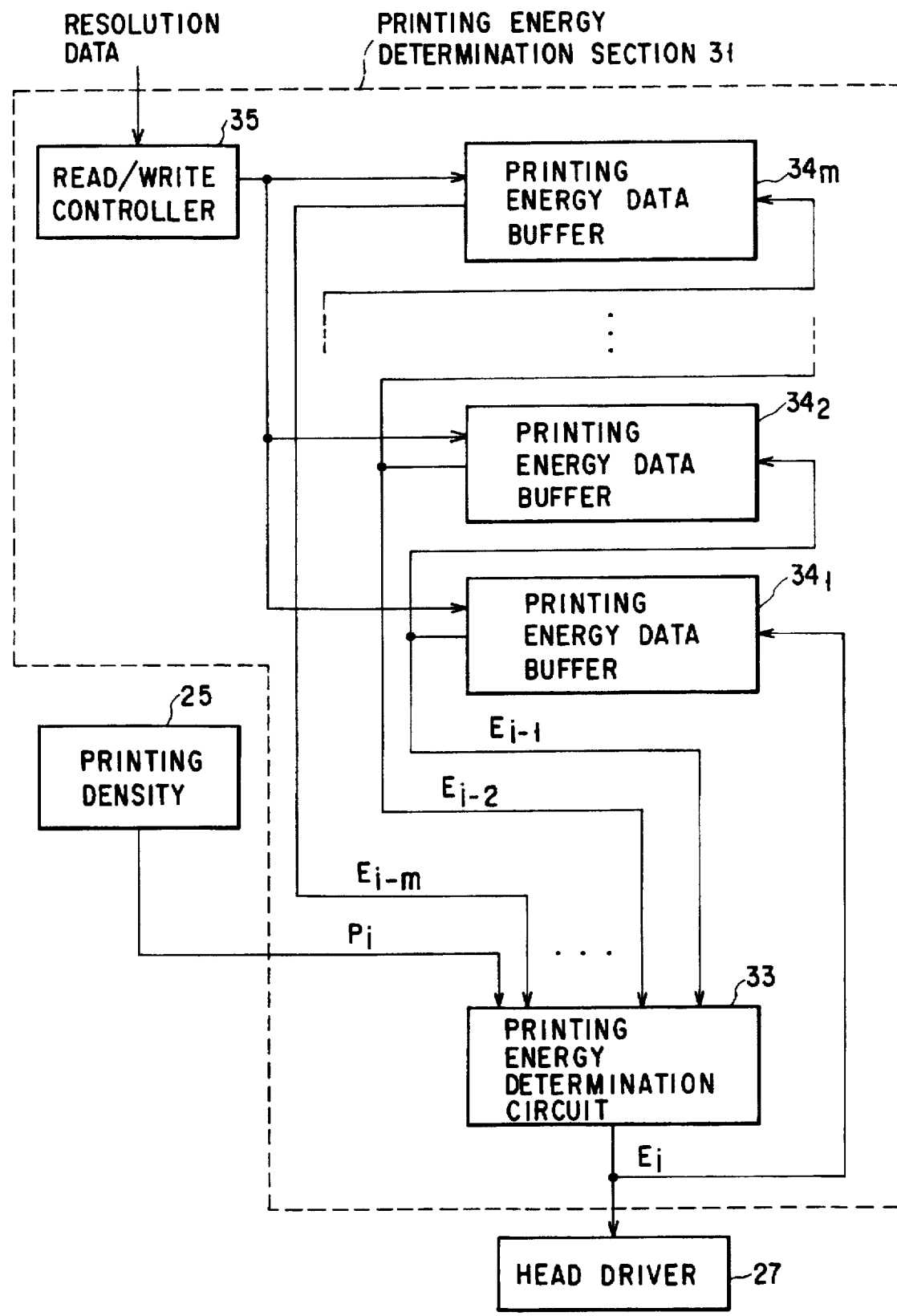
F I G. 8

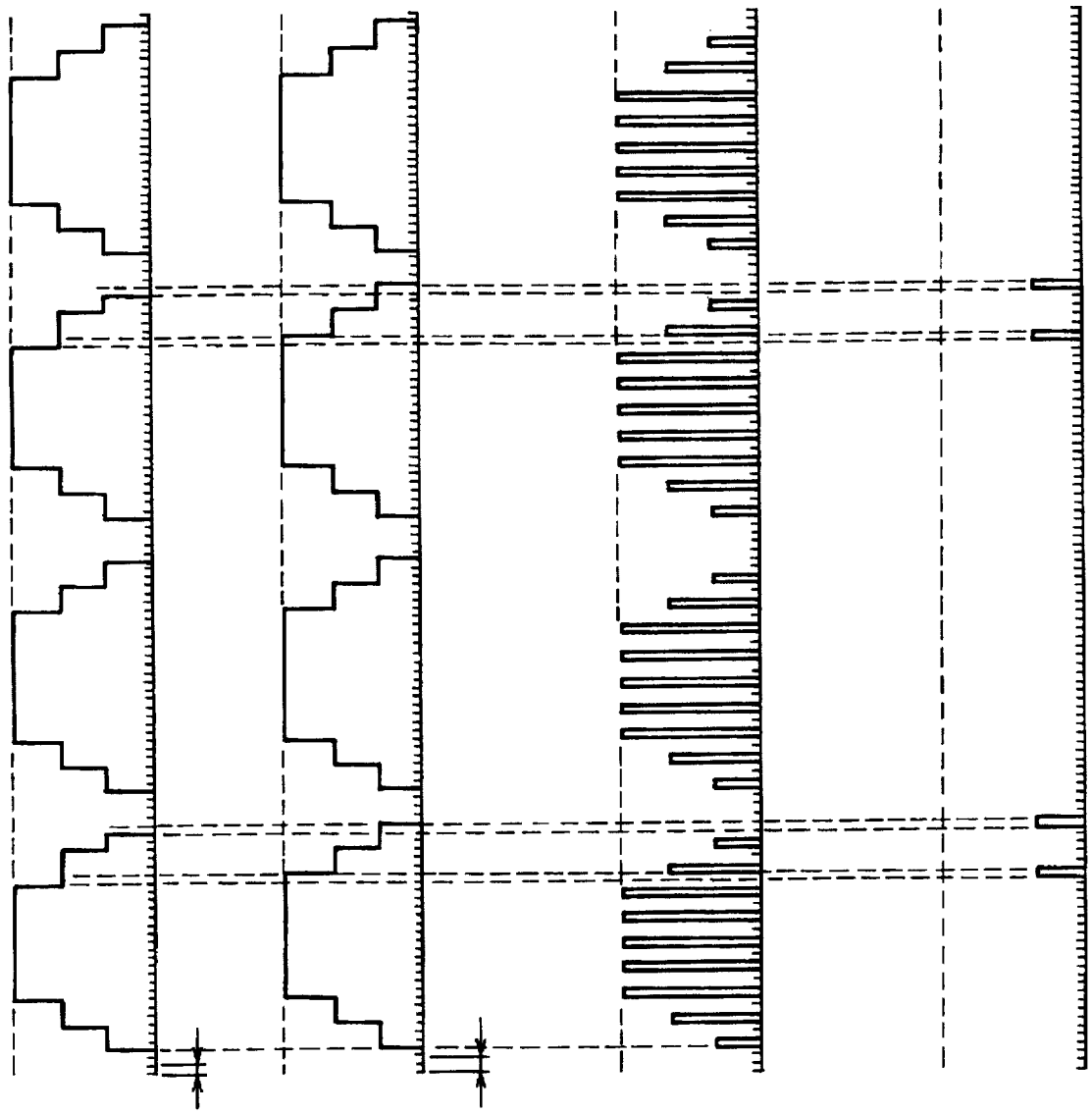

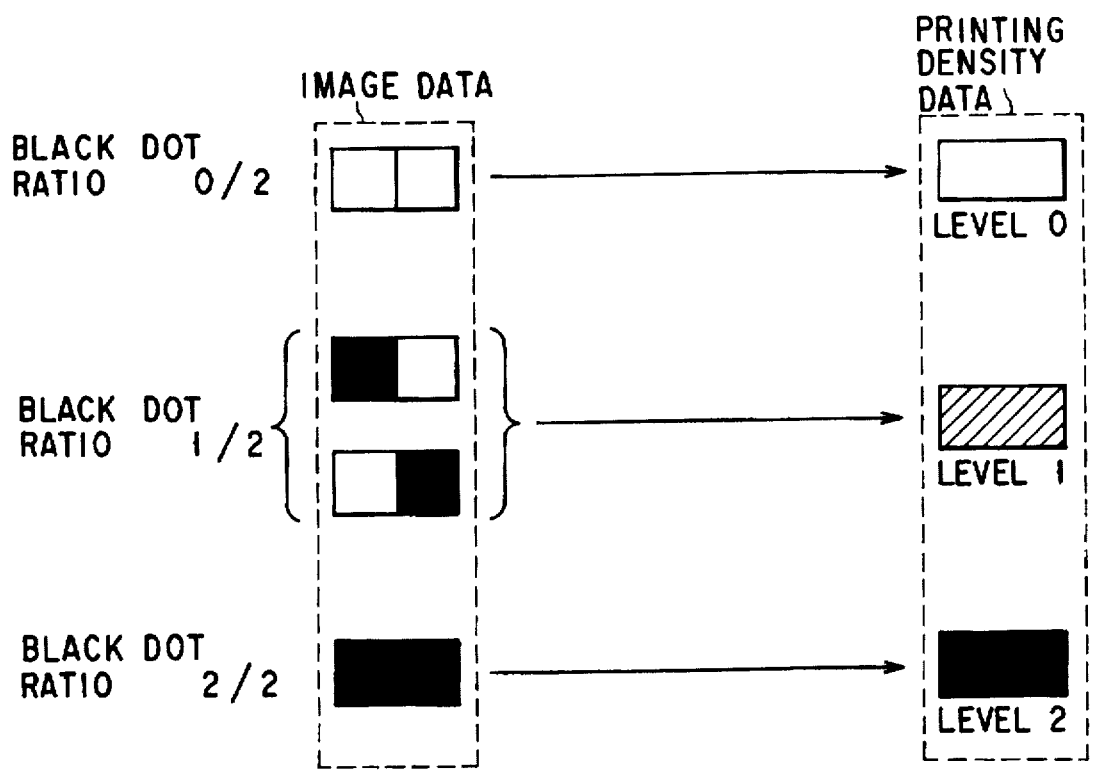
F I G. 14
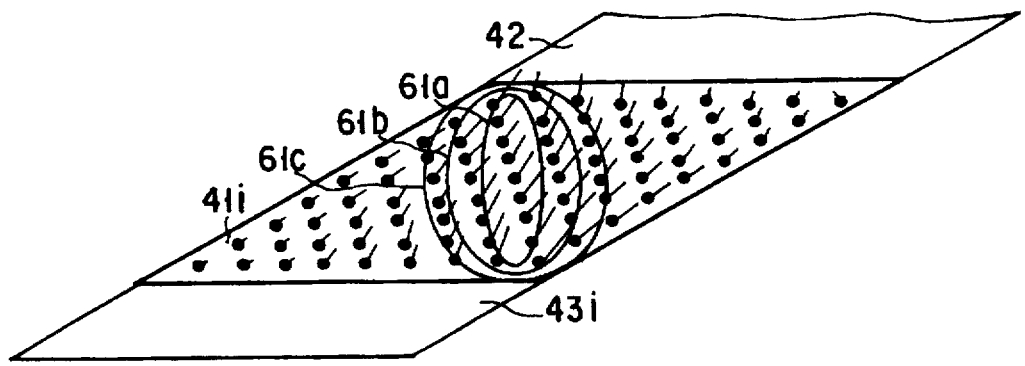
F I G. 15
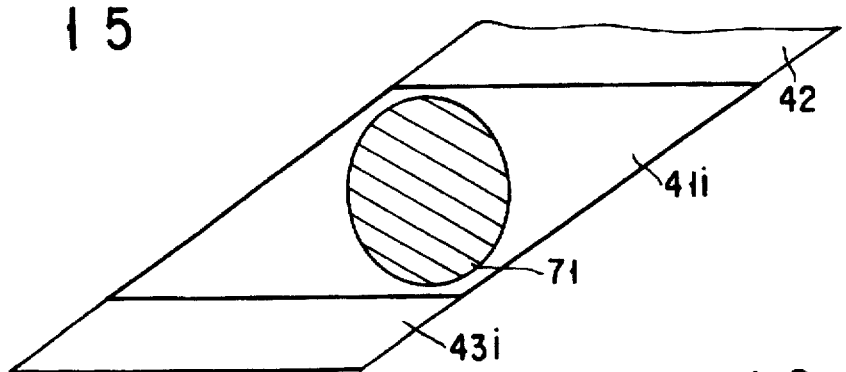
F I G. 16

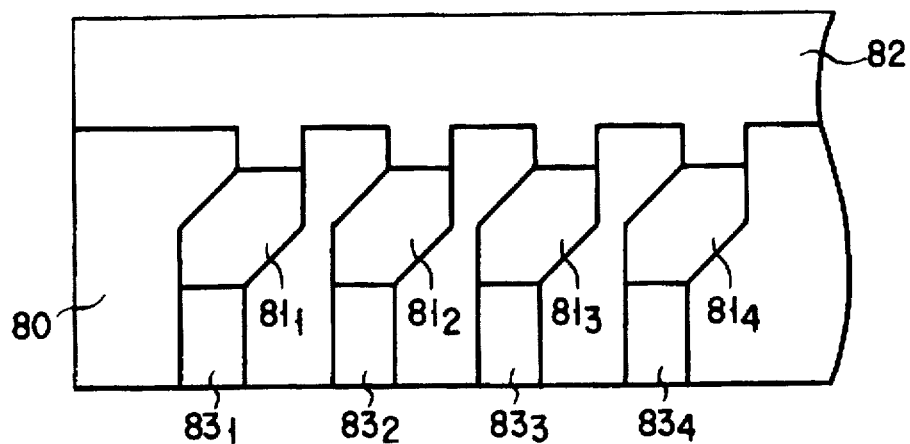
F I G. 20
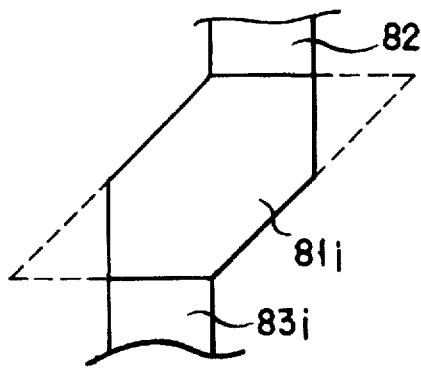
F I G. 21
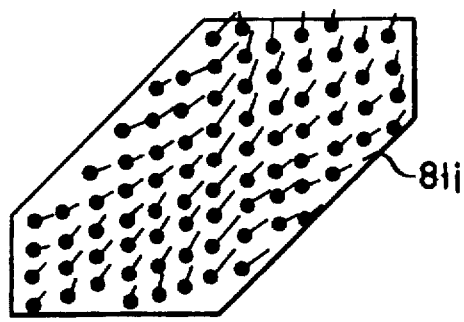
F I G. 22

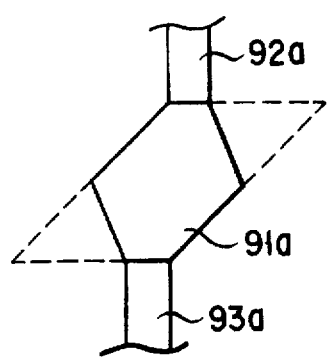
F I G. 23A
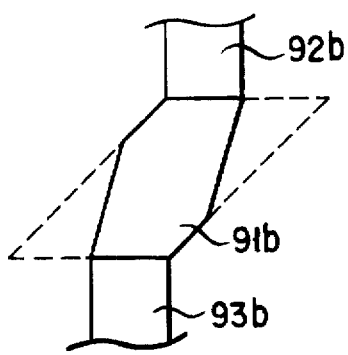
F I G. 23B
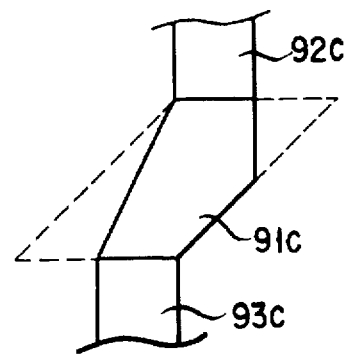
F I G. 23C
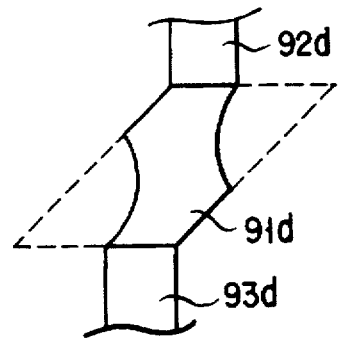
F I G. 23D
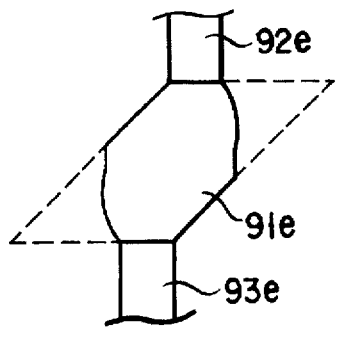
F I G. 23E
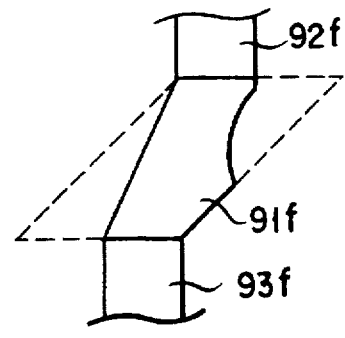
F I G. 23F
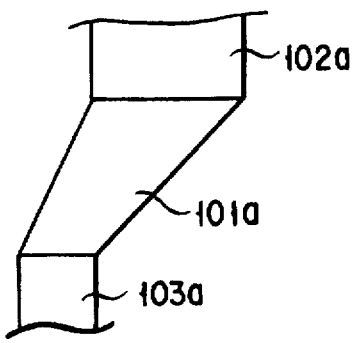
F I G. 24A
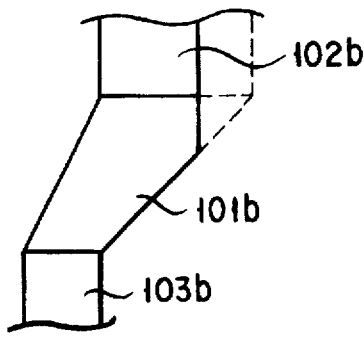
F I G. 24B
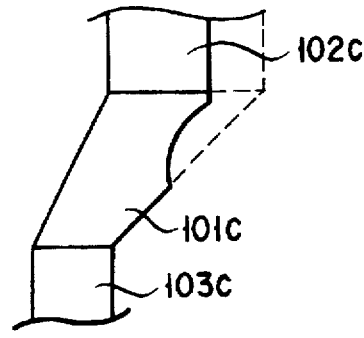
F I G. 24C

IMAGE DATA RESOLUTION ENHANCING APPARATUS

This is a continuation of application Ser. No. 08/186,862, filed Jan. 27, 1994, now abandoned.

BACKGROUND OF THE INVENTION

1. Field of the Invention

The present invention relates to a printing apparatus which, in response to supplied image data, prints a large number of dots arranged two-dimensionally on a printing sheet.

2. Description of the Related Art

Apparatuses of this type have their own maximum value of the printable pixel density (i.e., the pixel density). For example, in the case of the heat-transfer printing apparatus, the density of heating elements constituting a thermal head is the maximum value of the printable pixel density. Therefore, when image data whose pixel density is higher than the printable pixel density is given, this data, before printing, is converted into image data having as low a pixel density as can be printed.

With this method, however, the decreased pixel density degrades the quality of the printed image significantly as compared with the original image data. When such an apparatus as a copier itself reads image data, a difference in the pixel density cannot take place. However, when such an apparatus as a facsimile receives image data from another unit, the aforesaid difference in the pixel density can occur.

To prevent such a difference from occurring, an apparatus must be constructed so that printing may be effected at a pixel density equal to the highest density of the image data that can be supplied. For example, in the case of the heat-transfer printing apparatus, as the density of the heating elements of the thermal head is made higher, the pixels can be printed at a higher density accordingly.

When the density of heating elements is made higher, the number of heating elements increases and the manufacture becomes more difficult, resulting in a costly thermal head. In addition, because a larger number of heating elements must be driven, the size of the driving circuit increases, thus making the circuit more expensive.

As described above, a conventional thermal printing apparatus has a disadvantage in that when image data whose pixel density is higher than the printable pixel density is supplied, the quality of the printed image is seriously degraded as compared with that of the image indicated by the original image data. It has another disadvantage in that when the apparatus is constructed so that printing may be effected at a pixel density equal to the maximum pixel density of the image data that can be supplied, in order to always print at an image quality equal to that of the image indicted by the original image data, the manufacturing cost will rise.

SUMMARY OF THE INVENTION

Accordingly, it is an object of the present invention to provide a printing apparatus capable of printing even an image whose pixel density is higher than the printable pixel density with less degradation of the image quality, while keeping the recordable pixel density as low as possible to prevent the cost from rising.

According to the present invention, there is provided a printing apparatus which prints image data having a specific resolution by means of a printing head whose resolution in a main scanning direction is 1/k (k is a given integer) of that of the image data, the apparatus comprising means for extracting k consecutive image data items in the main scanning direction from the image data; means for determining a printing density of a pixel on the basis of the k image data items extracted by the extracting means and/or on the basis of the k image data items extracted by the extracting means and the printing density of a preceding printed pixel, and means for driving the printing head according to the printing density determined by the determining means.

With the printing apparatus of the present invention, even if image data whose pixel density is higher than the printable pixel density is supplied, it is possible to record an image whose quality is almost equal to that of the image indicated by the image data, without introducing a rise in the cost of the apparatus and an increase in the circuit size.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 graphically shows rules which must be referred in determining the printing gradation density in the heat-transfer printing apparatus according to the first embodiment;

FIGS. 5A and 5B show the original image and the image printed by the heat-transfer printing apparatus of the first embodiment for the sake of comparison;

FIGS. 6A, 6B, and 6C show the original image, the reading gradation density (analog signal) at the position of scanning line "A" of the original image, and the printing density distribution on the printed image corresponding to the position of the scanning line "A";

FIG. 7 is a schematic diagram of a heat-transfer printing apparatus according to a second embodiment of the present invention;

FIG. 8 is a detailed block diagram of a printing energy determination section of the second embodiment;

FIGS. 11A, 11B, 11C, and 11D show the simulation results of printing for explaining the effect of the heat-transfer printing apparatus according to the second embodiment;

FIG. 14 graphically shows rules which must be referred in determining the printing gradation density in the heat-transfer printing apparatus according to the third embodiment;

FIG. 15 illustrates the current distribution in a heating resistive element of the heat-transfer printing apparatus according to the third embodiment;

FIG. 16 illustrates the effective heating area of a heating resistive element in forming a printed dot of level 1 in the heat-transfer printing apparatus according to the third embodiment;

FIG. 20 is a plan view showing a thermal head of a heat-transfer printing apparatus according to a modification of the third embodiment;

FIG. 21 is a plan view showing a detailed configuration of the modification shown in FIG. 20;

FIG. 22 illustrates the current distribution in a heating resistive element of the modification shown in FIG. 20;

FIGS. 23A to 23F show detailed configurations of various modifications of a thermal head of the third embodiment; and FIGS. 24A to 24C are plan views showing other modifications of a thermal head of the third embodiment.

DETAILED DESCRIPTION OF THE PREFERRED EMBODIMENTS

A preferred embodiment of a printing apparatus according to the present invention will now be described with reference to the accompanying drawings.

Figure 1:
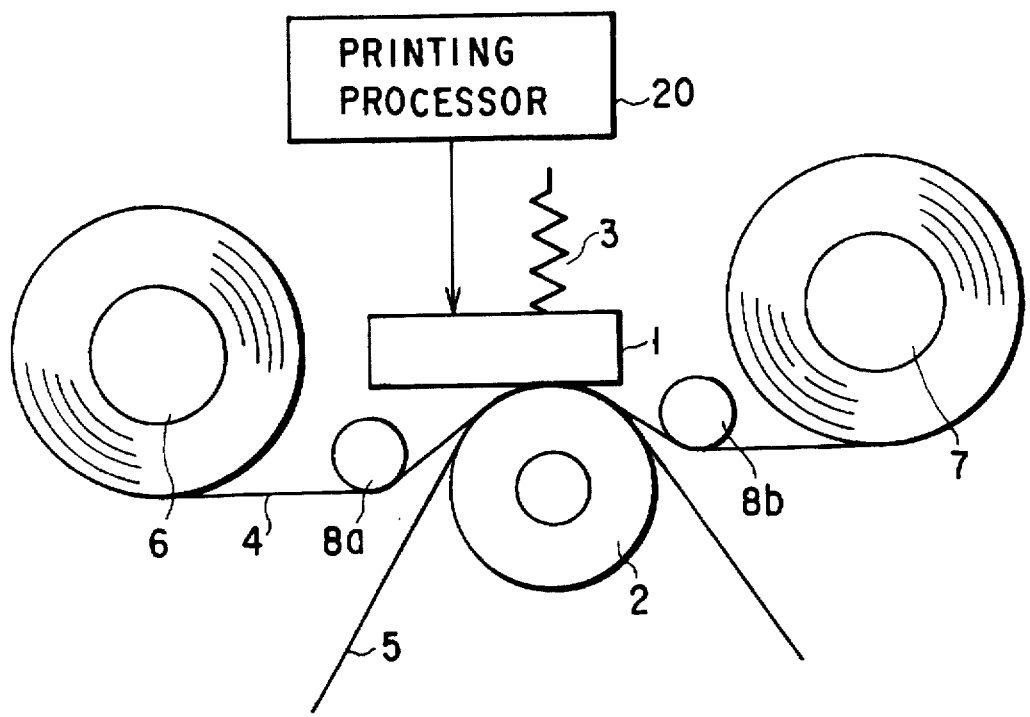
FIG. 1 is a schematic diagram of a heat-transfer printing apparatus according to a first embodiment of the present invention.

FIG. 1 is a sectional view showing the overall configuration of a heat-transfer printing apparatus according to a first embodiment of the present invention, for use in a facsimile or the like. Explaining here will be a case where the image data whose resolution is higher than the inherent resolution in the main scanning direction and equal to the inherent resolution in the sub-scanning direction is supplied to the heat-transfer printing apparatus.

There is provided a linear thermal head 1 composed of a plurality of heating resistive elements arranged one-dimensionally in the main scanning direction. The recording surface of the head 1 is pressed against a platen roller 2 by means of a spring 3. In FIG. 1, the main scanning direction is a direction perpendicular to the drawing paper. An ink film 4 and a printing sheet 5, the film 4 on top of the sheet 5, pass between the thermal head 1 and the platen roller 2. The lateral direction of the printing sheet 5 is the main scanning direction. The thermal head 1 is supplied with a signal from a printing processor 20. The ink film 4 is wound around a supply roller 6. The leading edge of the ink film 4 is secured to a take-up roller 7. As the take-up roller 7 rotates, the ink film 4 fed from the supply roller 6 is used for printing and then wound around the take-up roller 7. In the vicinity of the platen roller 2, there are provided guide shafts $8a$ and $8b$ for keeping the passage of the ink film 4 in a suitable state.

Figure 2:
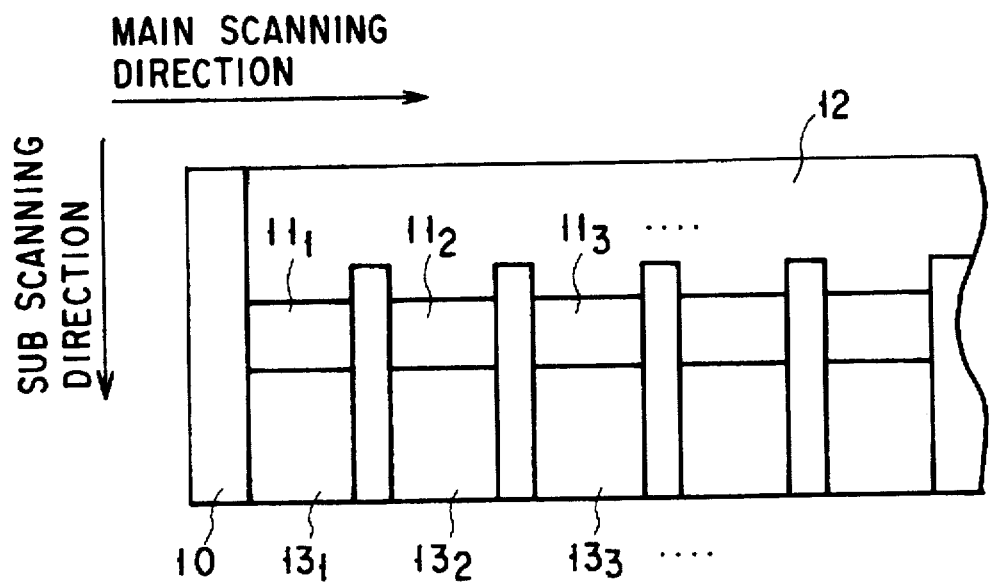
FIG. 2 is a plan view showing a detailed configuration of a thermal head of the heat-transfer printing apparatus of the first embodiment.

FIG. 2 is a plan view showing a detailed configuration of the thermal head 1 of FIG. 2. The thermal head 1 is constructed by arranging a large number of rectangular heating resistive elements $11_1$, $11_2$, .... one-dimensionally at regular intervals on an insulating substrate 10 with one end of each of the heating resistive elements $11_1$, $11_2$, ... connected to a common electrode 12, and the other end of each resistive element connected to individual electrodes $13_1$, $13_2$, respectively.

Figure 3:
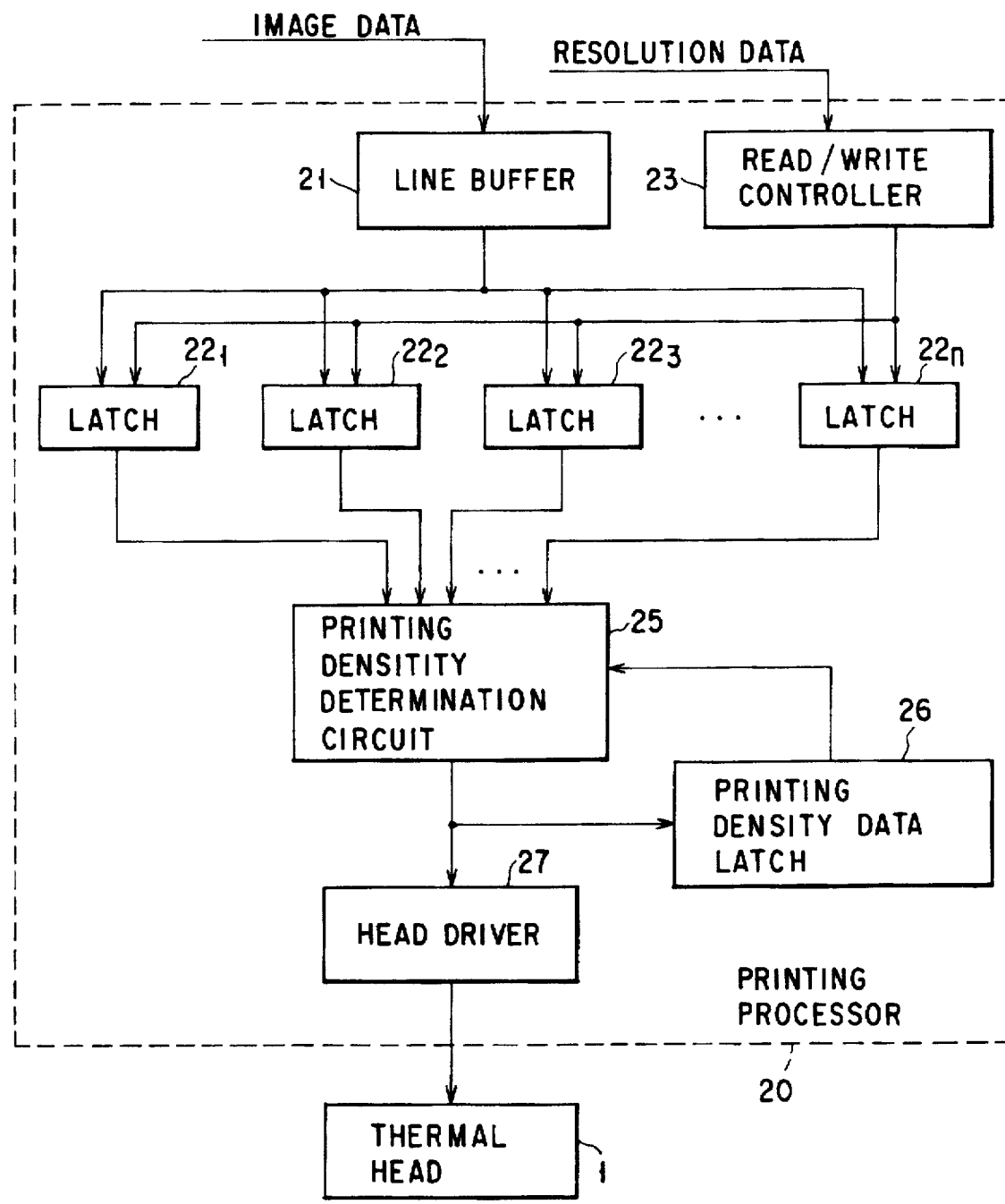
FIG. 3 is a block diagram of the electric circuitry of the heat-transfer printing apparatus of the first embodiment.

FIG. 3 is a block diagram of the electric circuitry of the printing processor 20. The image data of each line (a line in the main scanning direction) externally supplied from, e.g., the receiving section of a facsimile machine or the reading section of a copier, is temporarily stored in a line buffer 21. The line buffer 21 outputs the stored image data at a specific rate.

The dot data on each bit of the image data output from the line buffer 21 is supplied to latch memories $22_1$, $22_2$, ..., $22_n$ in sequence. Here, the number of latch memories n is determined as follows. Although the resolution (pixel density) in the main scanning direction of the thermal head 1 is determined by the pitch of heating resistive elements $11_1$, $11_2$, ..., the value of n is set so that even if the image data whose resolution in the main scanning direction is up to n times the determined resolution is supplied, it may be dealt with. Therefore, all latch memories $22_1$, $22_2$, ..., $22_n$ are not always used. When the resolution in the main scanning direction of the actually supplied image data is i times the resolution in the main scanning direction inherent to the head (i<n), each dot data on each bit is supplied only to i latch memories $22_1$, $22_2$, ..., $22_i$ in sequence. This control is performed by a read/write controller 23. For example, the horizontal resolution of the supplied image data is three times as high as that of the thermal head, each dot data item on each bit is written in latch memories $22_1$, $22_2$, and $22_3$ periodically. In other words, since the resolution of the thermal head 1 is one-third that of the image data, three dot data items of the image data must be expressed by using a single heating resistive element. To achieve this, the individual latch memories $22_1$, $22_2$, and $22_3$ latch every third dot data item, so that the latch memories $22_1$, $22_2$, and $22_3$ extract the dot data items on consecutive three pixels.

The outputs of the latch memories $22_1$, $22_2$, ..., $22_n$ are supplied to a printing density determination circuit 25. The printing density determination circuit 25 determines the printing density of a pixel to be printed this time on the basis of the i original pixel data items extracted by latch memories $22_1$, $22_2$, ..., $22_i$ and the printing density of the preceding printed pixel, and outputs the printing density data. Namely, the printing density determination circuit 25 converts i original pixel data items (binary data items) into a single printing density data item (multi-value data item) of a printing pixel.

The printing density data is supplied to a head driver 27 and is also held in a printing density data latch 26. The output of the latch 26 is fed back as the preceding printing density data to the printing density determination circuit 25.

The head driver 27 drives each of the heating resistive elements $11_1$, $11_2$, ... of the thermal head 1 on the basis of the printing density data output from the printing density determination circuit 25.

Now, the operation of the heat-transfer printing apparatus thus constructed will be explained. For convenience of explanation, it is assumed that the resolution in the main scanning direction of the image data externally supplied is three times as high as the resolution in the main scanning direction inherent to the head 1.

First, one line of image data is temporarily stored in the line buffer 21 and the individual dot data items are written in latch memories $22_1$, $22_2$, and $22_3$ in sequence.

The printing density determination circuit 25 determines which of four levels, level 0 to level 3, the printing density of a pixel to be printed next should take as shown in FIG. 4, on the basis of the three original data items output from the latch memories $22_1$, $22_2$, and $22_3$ and the printing density of the preceding printed pixel latched in the printing density data latch 26. The relationship between these four levels is: level 0<level 1<level 2<level 3.

FIG. 4 graphically shows a way to determine the printing density. In FIG. 4, the white portions of the original image data items indicate that a dot is absent (e.g., bit data=0), whereas the black portions indicate that a dot is present (e.g., bit data=1).

It can be seen from FIG. 4 that the printing density is determined as follows:

(1) When all of the three original data items indicate that a dot is absent (black dot ratio=0/3), the printing density of a pixel to be printed next is determined to be at level 0. (2) When only one of the three original image data items indicates that a dot is present (black dot ratio=1/3) and the preceding printing density L is at any level other than level 0, the printing density of a pixel to be printed next is determined to be at level 1.

(3) When only one of the three original image data items indicates that a dot is present (black dot ratio=1/3) and the preceding printing density L is at level 0, the printing density of a pixel to be printed next is determined to be at level 2.

(4) When only two at both ends of the three original image data items indicate that a dot is present (black dot ratio=2/3) and the preceding printing density L is at level 3, the printing density of a pixel to be printed next is determined to be at level 1.

(5) When only two at both ends of the three original image data items indicate that a dot is present (black dot ratio=2/3) and the preceding printing density L is at any level other than level 3, the printing density of a pixel to be printed next is determined to be at level 2.

(6) When only two consecutive ones of the three original image data items indicate that a dot is present (black dot ratio=2/3), the printing density of a pixel to be printed next is determined to be at level 2.

(7) All of the three original image data items indicate that a dot is present (black dot ratio=3/3), the printing density of a pixel to be printed next is determined to be at level 3.

The printing density determination circuit 25 performs the above-mentioned determination process on the three original image data items extracted from the latch memories $22_1$, $22_2$, and $22_3$ repeatedly, and sequentially supplies the printing density data on the pixels to be printed not only to the head driver 27 but also to the printing density data latch 26.

The head driver 27 drives the thermal head 1 by controlling the amount of conducting energy to the individual heating resistive elements $11_1$, $11_2$, . . . of the thermal head 1 according to each printing density data item. Here, because level 0 is a white level (at which no dot is printed), the amount of energy is 0. Level 1 is set to the amount of energy which itself is insufficient for printing a dot but, when added with a small amount of energy, can print a dot whose gradation density corresponds to a black dot ratio of 1/3. Level 2 is set to the amount of energy required for printing a dot whose density corresponds to a black dot ratio of 2/3. Level 3 is set to the amount of energy necessary for printing a normal black dot. The head driver 27 conducts electricity so that these amounts of energy may be supplied to the heating resistive elements $11_1$, $11_2$, . . . The amount of energy supplied to the heating resistive elements $11_1$, $11_2$, . . . can be changed according to the applied voltages to them and the conducting time.

Converting three image data items (binary data items) into a single printing density data item (multi-level data item) in this way has the following meaning. Since the binary image data of three bits are converted so that the black dot ratio may not change, the printing density after the conversion has four levels. With the present invention, the black dot ratio of the original image data for three pixels is not always directly converted into the printing density level. As describe above, exceptions like items (3)and (4)are set up. This is done to reflect in the printing density the tendency of black dots to concentrate in the image data.

Specifically, when only one of three original image data items indicates that a dot is present, a dot of level 1 with the lowest density is printed in the position corresponding to the three original image data items. However, when the preceding adjacent printed dot is at one of level 1 to level 3, this means that energy is being applied to the heating element corresponding to he adjacent dot. Under the influence of such energy, a dot of level 1 is printed. When the adjacent dot is at level 0, however, no dot is printed. Therefore, with the present invention, in the case of item (3)where only one of the three original image data items indicates that a dot is present, and the printing density of the preceding printed dot is at level 0, energy of level 2 is supplied to the head to print a dot of level 2. When only two of the three original pixel data items indicate that a dot is present, a dot of level 2 whose printing density corresponds to a black dot ratio of 2/3 is printed in the position corresponding to the three original image data items. However, when the original image data items indicating that a dot is present are separate at both ends of the three original image data items, the central original pixel indicating that a dot is absent is more likely to be a white thin line in the black ground. To prevent this white thin line from being lost, a dot of level 1, whose printing density is low, is printed. When all of the three original image data items indicate that a dot is present, a dot of level 3, whose printing density is the highest, is printed in the position corresponding to the three original image data items.

With this method, for example, when the image data obtained by reading the image as shown in FIG. 5A is received and recording is effected, the image as shown in FIG. 5B is printed. As shown, dots of the highest printing density are printed in the central portion of the black image portion, assuring a sufficient black printing density. In the contour portion, the printing density of dots is processed so as to change stepwise in such a manner that the notched contour is inconspicuous.

The reason why the notched contour is made inconspicuous by changing the printing density of dots stepwise in the contour portion as described above is as follows. When the image shown in FIG. 6A is read in the position of scanning line "A", an analog image signal representing the density is as shown in FIG. 6B. As seen from FIG. 6B, the read density in the contour portion changes gradually. On the other hand, since the printing density of the printed image produced by the heat-transfer printing apparatus of the present embodiment changes stepwise in the contour portion, the printing density distribution in the main scanning direction is as shown in FIG. 6C. As a result, the printing density distribution of the printed image approximates the density distribution of the image data so well that the contour portion looks smooth.

As described above, with the first embodiment, the density distribution of an image is estimated on the basis of the image data, and the printing density of dots to be printed is changed so that the printing density distribution approximating the estimated distribution may be obtained. Therefore, although the pixel density (resolution) in the main scanning direction that can be achieved by the thermal head 1 is lower than that of the image data, the thermal head 1 can print a high-quality image approximating the image indicated by the original image data. This reduces the number of heat resistive elements constituting the thermal head 1, making its cost lower. Further, because there is no increase in the circuit size of the head driver 27, it is possible to keep the manufacturing cost low. While in the above explanation, the resolution in the main scanning direction of the image data supplied externally is three times the resolution in the main scanning direction inherent to the head 1, the present invention may, of course, be applied to the image data whose resolution in the main scanning direction is up to n times that inherent to the head 1.

Hereinafter, other embodiments of the present invention will be explained. In its explanation, the parts corresponding to those of the first embodiment are indicated by the same reference numerals, and their detailed explanation will be omitted.

In the first embodiment, the resolution of the image data differs from that of the head 1 only in the main scanning direction, whereas they are the same in the sub-scanning direction. Explained next will be a second embodiment which can deal with a case where the resolution in the sub-scanning direction of the head 1 (determined by the length of the heating resistive elements $11_1$, $11_2$, . . . in the sub-scanning direction) is also lower than that of the image data.

In general, the pixel density in the sub-scanning direction can be easily regulated by changing the feed pitch of a printing sheet for one line of printing. However, a general-purpose thermal head is often designed to print an image which has the same pixel density in both the main scanning direction and the sub-scanning direction, such as 200 dpi× 200 dpi. Therefore, when the feed pitch of a printing sheet for one line of printing is made smaller to increase the pixel density, this makes the length of the heating resistive elements in the sub-scanning direction (the direction perpendicular to the arrangement direction) longer than the optimum value, sometimes permitting lines of printed dots to overlap each other. When lines of dots have overlapped each other, the applied energy during the printing of each line acts on each other in the overlapped portions. Thus, even if the printing density of one printing is as low as one-(the number of overlaps)th the normal printing density, the printing density control of dots cannot be performed as expected.

To overcome this problem, it can be considered that the length of the heating resistive elements $11_1$, $11_2$, . . . in the sub-scanning direction (the direction perpendicular to the arrangement direction) is set at a value corresponding to the maximum value of the resolution in the sub-scanning direction of the supplied image data to manufacture a head 1. Such a high-resolution thermal head leads to higher manufacturing costs.

Therefore, in the second embodiment, instead of the printing processor 20 of FIG. 3, a printing processor 20A shown in FIG. 7 is provided. The configuration as far as the printing density determination circuit 25 is the same as that of the first embodiment. In the second embodiment, the printing density is not directly converted into printing energy, but is supplied to a printing energy determination section 31, the output of which is supplied to the head driver 27.

The details of the printing energy determination section 31 is shown in FIG. 8. The determination section 31 comprises m printing energy data buffer memories $34_1$, $34_2$, . . . , $34_m$ for a single line, a printing energy determination circuit 33, and an R/W controller 35 for controlling the reading and writing of the buffer memories. The output of the printing density determination circuit 25 is supplied to the printing energy determination circuit 33. One line of printing energy $E_i$ determined at the printing energy determination circuit 33 is supplied to the head driver 27 and is also written in the first printing energy data buffer memory $34_1$. When one line of printing energy has been determined, the outputs of printing energy data buffer memories $34_1$, $34_2$, . . . , $34_{m-1}$ are supplied to printing energy data buffer memories $34_2$, $34_3$, . . . , $34_m$, and are also supplied to the determination circuit 33 as printing energy $E_{i-1}$ to $E_{i-(m-1)}$ for lines one to (m-1) lines before the current one. The output of the printing energy data buffer memory $34_m$ is also supplied to the determination circuit 33 as printing energy $E_m$ for the line m lines before the current one. In this way, the printing energy determination circuit 33 determines the printing energy to be supplied to the head 1 for printing a line of dots on the basis of the output of the printing density determination circuit 25 and the outputs of the printing energy data buffer memories $34_1$, $34_2$, . . . $34_m$.

Here, since the larger the number of buffer memories m, the higher the resolution in the sub-scanning direction can be made, it is desirable that m should be as large as possible. Thus, the number of buffer memories used is determined according to the resolution in the sub-scanning direction of the image data. This control is performed by the read/write controller 23. When the resolution (pixel pitch) in the sub-scanning direction of the image data supplied to the apparatus is 1/j (j<m) of the length of the heating resistive elements $11_1$, $11_2$, $11_3$ . . . of the head 1, only (j−1) buffer memories $34_1$, $34_2$, . . . , $34_{j-1}$ are used. For example, when the resolution in the sub-scanning direction of the supplied image data is three times as high as that of the thermal head 1, the printing energy E for each line is determined on the basis of data items $E_{i-1}$ and $E_{i-2}$ in the buffer memories $34_1$ and $34_2$ and the printing density $P_i$ of the line supplied from the printing density determination circuit 25.

Now, the operation of the heat-transfer printing apparatus thus constructed will be described. Here, it is assumed that the resolution in the sub-scanning direction of the image data is 1/j (j<m) of the effective length in the sub-scanning direction of the heating resistive elements $11_1$, $11_2$, $11_3$, . . .

First, the printing energy buffer memories $34_1$, $34_2$, . . . , $34_{j-1}$ take in one line of printing energy data items determined at the printing energy determination circuit 33 in sequence and then transfer these data items. Specifically, the printing energy buffer memories $34_1$, $34_2$ . . . $34_{j-1}$ store the printing data items to print the dots corresponding to the pixels at the same position in the main scanning direction of the printing lines one to (j−1) lines before the one whose printing energy is determined at the determination circuit 33, that is, corresponding to the pixels arranged in the sub-scanning direction.

The printing energy determination circuit 33 determines printing energy $E_i$ for the i-th line as follows on the basis of the printing density data $P_i$ determined at the printing density determination circuit 25, and the outputs $E_{i-1}, \ldots, E_{i-(j-1)}$ of the printing energy buffer memories $34_1, 34_2, \ldots, 34_{j-1}$.

Figure 9:
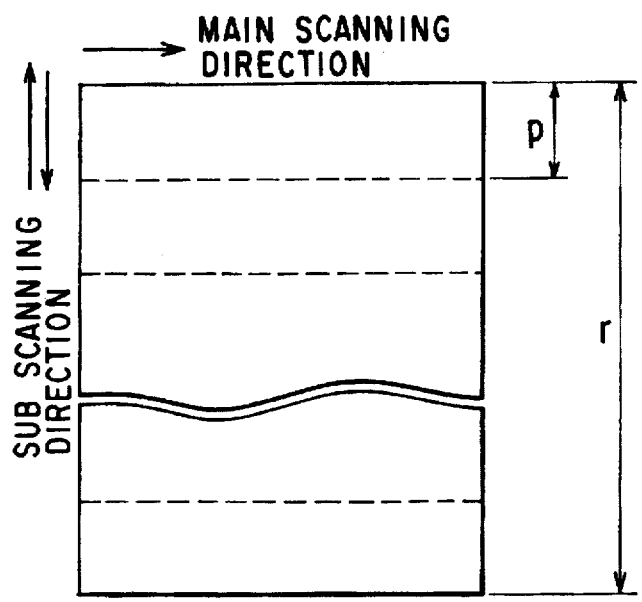
FIG. 9 illustrates overwriting in the second embodiment.

It is assumed that the effective length in the sub-scanning direction of the heating resistive elements $11_1, 11_2, \ldots$ of the thermal head 1 is r as shown in FIG. 9, and that the resolution (pixel pitch) in the sub-scanning direction of the supplied image data is the 1/j of the effective length r of the heating resistive elements $11_1, 11_2, 11_3, \ldots$ of the head 1. Then, the feed pitch p of a printing sheet 5 will be determined as follows:

$$j=r/p$$

Figure 10A:
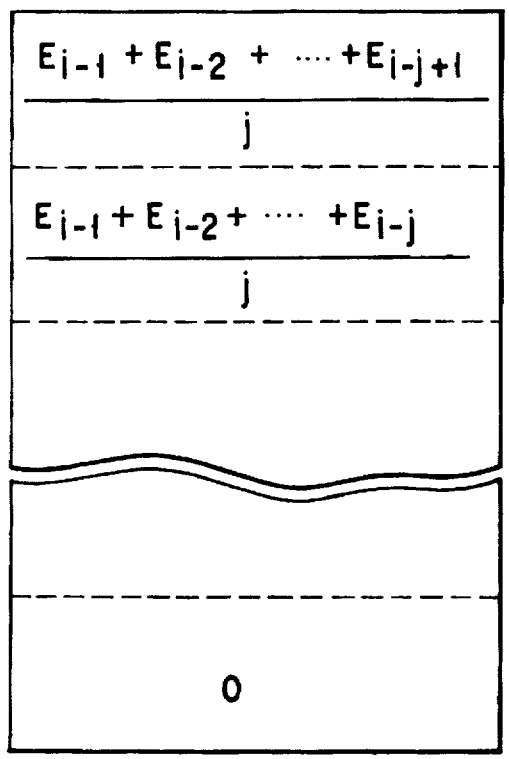
FIGS. 10A and 10B are diagrams for explaining the printing energy of each line in overwriting.

In this case, when a line of dots is printed, the energy has been already applied to the heating resistive elements in order to print the dots at the same position in the main scanning direction in printing the lines one to (j−1) lines before the present one in the dot print area (the area whose length in the sub-scanning direction is p). Specifically, as shown in FIG. 10A, energy has been applied to the dot print area of each line on the printing sheet. The top row in FIG. 10A corresponds to the line to be printed this time. Although the energy used to print each line differs from point to point in the main scanning direction, the energy for a line in the main scanning direction is expressed as E for convenience of explanation.

Figure 10B:
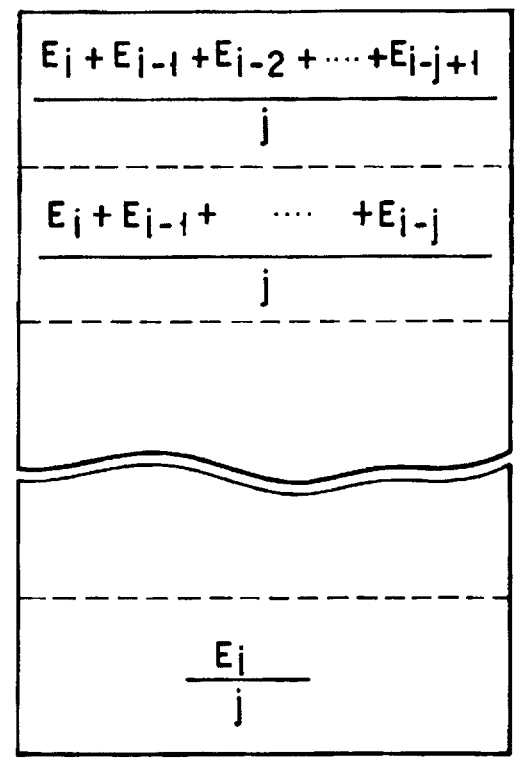

In this state, when a given energy of $E_i$ is supplied to the head 1, the energy as shown in FIG. 10B is applied to the dot print area for each line on the printing sheet. Since the head 1 corresponds to the dot printing area of j lines, the energy applied to each dot print area during one energy application is 1/j. Therefore, the printing energy Es for the top-row dot printing line of FIG. 10B is expressed as:

$$Es=(E_{i-j+1}+E_{i-j+2}+\ldots+E_{i-(j-1)})/j$$

The printing energy determination circuit 33 determines $E_i$ to be supplied this time so that the top-row energy Es may be as equal to the energy corresponding to printing density data $P_i$ as possible. However, when the total of the printing energy for the (j−1) lines one to (j−1) lines before the current one has already exceeded the energy corresponding to $P_i$, the printing energy determination circuit 33 determines $E_i$ to be 0. The printing energy determination circuit 33 outputs the energy data indicating the determined printing energy $E_i$ to the head driver 27.

The printing energy determination circuit 33 repeatedly performs the above determination process on the printing density data $P_i$ supplied sequentially from the printing density determination circuit 25, and outputs printing energy data $E_i$ in sequence.

The head driver 27 drives the thermal head 1 by controlling the conduction of the heating resistive elements $11_1, 11_2, \ldots$ of the thermal head 1 according to the printing energy data $E_i$. At this time, the head driver 27 applies the energy indicated by each printing image data item $E_i$ to the individual heating resistive elements $11_1, 11_2, \ldots$.

FIGS. 11A to 11D show the simulation results of printing in the second embodiment. Here, it is assumed that the number of gradation levels is four as with the first embodiment, and the number of overwrites j is two. The vertical axis in FIGS. 11A to 11D indicates the magnitude of energy, and the horizontal axis indicates the printing position in the sub-scanning direction. Graduations on the horizontal axis in FIG. 11A represent the size of pixels (dots) in the sub-scanning direction indicated by the image data. Graduations on the horizontal axis in FIG. 11B show the size of the heating resistive elements in the sub-scanning direction.

FIG. 11A shows energy $P_i$ at which printing is to be effected supplied from the printing density determination circuit 25. FIG. 11B represents energy Es corresponding to the printing density of dots actually printed on the printing sheet. Printing energy $E_i$ for each printing is shown in FIG. 11C. FIG. 11D illustrates error in excess printing energy Es when the total of the printing energy for the previous (j−1) lines has already exceeded the energy corresponding to $P_i$. It can be understood from these simulation results that the supply of excess energy is very small and the difference between the energy at which printing is to be effected and the actual printing energy is very small.

With this embodiment, since the effective length of the heating resistive elements $11_1, 11_2, \ldots$ in the sub-scanning direction is larger than the feed pitch of the printing sheet 5, even if each line is printed by more than one heating operation, energy for printing each line is controlled so that the desired energy may be applied by overwriting, with a result that an image with the desired printing density can be printed.

This makes it possible to print a high-quality image even with a general-purpose, very inexpensive thermal head 1 whose resolution is low in both the main scanning and the sub-scanning directions, even if the image data whose resolution is high in both the main scanning and the sub-scanning directions is supplied. While in the above description, the resolution in the sub-scanning direction of the image data externally supplied is j times as high as the resolution inherent to the head 1, the present invention may be, of course, applied to the image data whose resolution is up to (m+1) times as high as that inherent to the head 1.

The thermal printing apparatuses in the first and the second embodiment are suitable for facsimile machines. This is because the facsimile machine can use image data with more than one resolution and there is a possibility that it will receive image data whose resolution is higher than the printable resolution. With a conventional facsimile machine, when the image data whose resolution is higher than the printable resolution arrives, the arrived image is sampled to convert it into image data with a printable resolution. Therefore, part of the transferred data must be discarded, wasting much of the data. Use of a thermal printing apparatus of the present invention can reduce such waste because it can use all the data arrived.

As in the first and the second embodiment, by determining the printing density of each dot, taking into account the printing density of adjacent dots (specifically, the preceding one) in the main scanning direction, a high-quality image can be printed if the image is made up of characters or line drawings having the nature of black or white dots to concentrate to some extent (what is called a statistical characteristic of the image). However, for an image having almost no statistical characteristic such as a pseudo half-tone image in the error diffusion system, when the printing density of a dot to be printed is determined, taking into account the printing density of the adjacent printing dots as in the first and the second embodiment, the statistical characteristic develops, resulting in the danger of degrading the image quality.

To overcome this drawback, it can be considered that the printing density is determined without considering the printing density of the adjacent dots. In this case, however, the quality of an image having a statistical characteristic such as a character or a line drawing is degraded as compared with the above embodiments.

Explained next will be a third embodiment which eliminates the above drawback and is able to excellently print both an image having a statistical characteristic such as a character or a line drawing and an image having almost no statistical characteristic such as a pseudo half-tone image in the error diffusion system. The third embodiment is designed to cope with a case where the image data whose resolution in the main scanning direction is high and that in the sub-scanning direction is the same is supplied.

Figure 12:
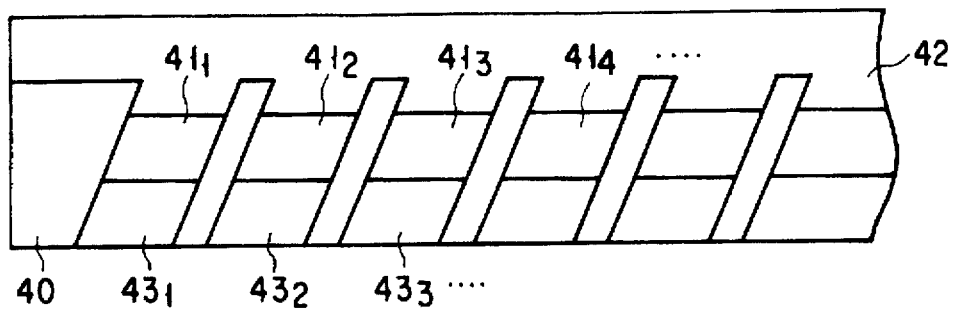
FIG. 12 is a plan view showing a detailed configuration of a thermal head of a heat-transfer printing apparatus according to a third embodiment of the present invention.

FIG. 12 is a plan view showing a detailed configuration of a thermal head in the third embodiment. A schematic configuration of a heat-transfer printing apparatus to which a thermal printing apparatus of this embodiment is applied is similar to that of the first embodiment of FIG. 1.

The thermal head is formed of a number of parallelogrammic heating resistive elements $41_1$, $41_2$, .... arranged one-dimensionally at regular intervals in the main scanning direction (lateral direction of a printing sheet) on an insulating substrate 40, with one end of each of heating resistive elements $41_1$, $41_2$, .... connected to a common electrode 42 and the other end of each element connected to individual electrodes $43_1$, $43_2$, ....

Figure 13:
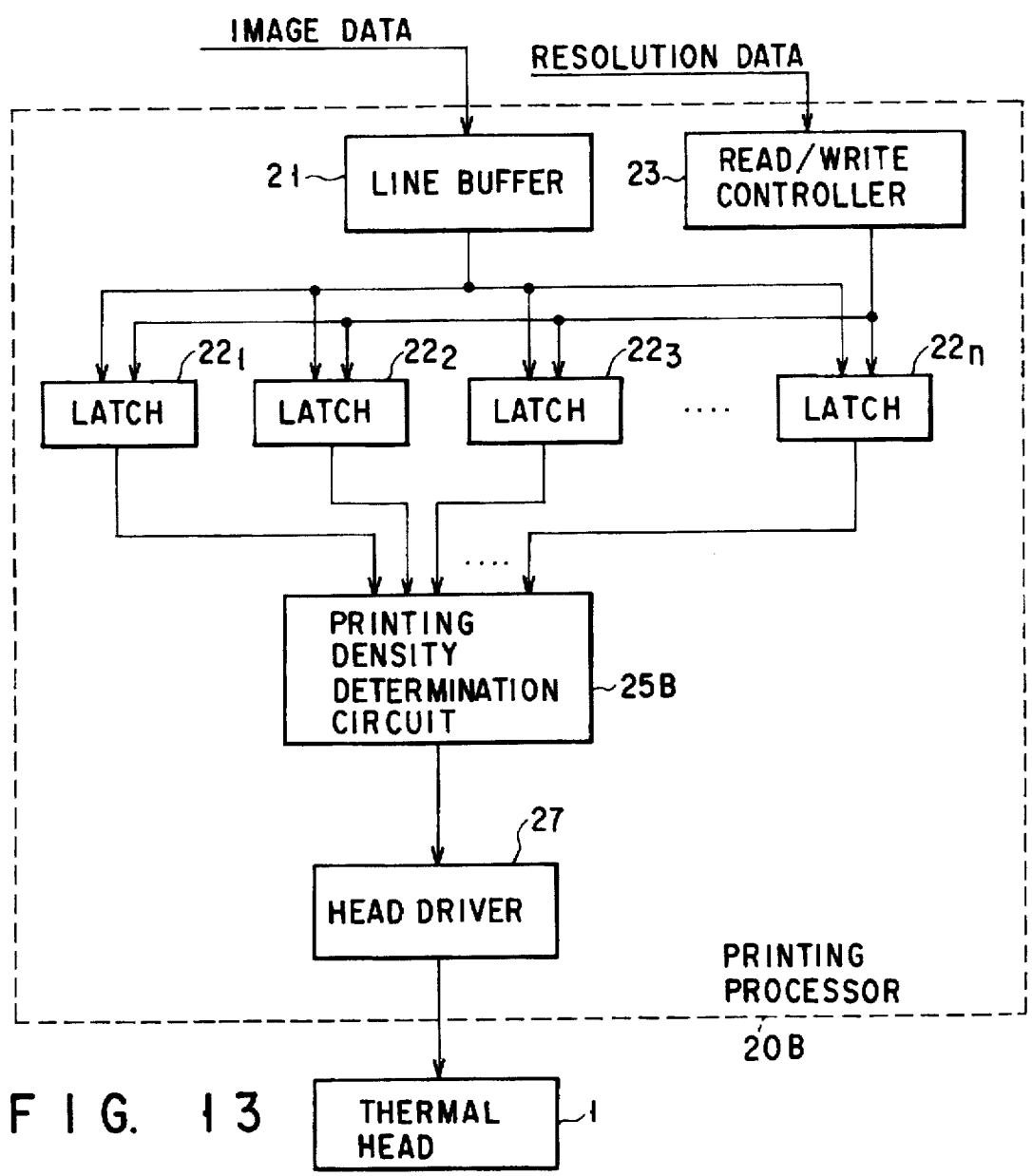
FIG. 13 is a block diagram of the electric circuitry of the heat-transfer printing apparatus of the third embodiment.

In the third embodiment, instead of the printing processor 20 of FIG. 3, a printing processor 20B of FIG. 13 is used. The printing processor 20B of the present embodiment is obtained by eliminating the printing density data latch 26 from the printing processor 20 of the first embodiment and providing a printing density determination circuit 25B different from that of the first embodiment.

The operation of the heat-transfer printing apparatus thus constructed will be explained. For convenience of explanation, it is assumed that the resolution in the main scanning direction of the image data externally supplied is twice as high as the resolution in the main scanning direction inherent to the head 1.

First, one line of image data is temporarily stored the line buffer 21 and the individual dot data items are written in latch memories $22_1$ and $22_2$ in sequence.

The printing density determination circuit 25B determines which of three levels, level 0 to level 2, the printing density of a dot to be printed next should take as shown in FIG. 14, on the basis of the two original data items output from the latch memories $22_1$ and $22_2$. The relationship between these levels is: level 0<level 1<level 2.

FIG. 14 graphically shows a way to determine the printing density. In FIG. 14, the white portions of the original image data items indicate that a dot is absent (e.g., bit data=0), whereas the black portions indicate that a dot is present (e.g., bit data=1).

It can be seen from FIG. 14 that the printing density is determined as follows:

(1) When all of the two original data items indicate that a dot is absent (black dot ratio=0/2), the printing density of a dot to be printed next is determined to be at level 0.

(2) When only one of the two original image data items indicates that a dot is present (black dot ratio=1/2), the printing density of a dot to be printed next is determined to be at level 1.

(3) All of the two original image data items indicate that a dot is present (black dot ratio=2/2), the printing density of a dot to be printed next is determined to be at level 2.

The printing density determination circuit 25B repeatedly performs the above-mentioned determination process on the two original image data items extracted from the latch memories $22_1$ and $22_2$, and sequentially supplies the printing density data on the dots to be printed to the head driver 27.

The head driver 27 drives the thermal head 1 by controlling the amount of conducting energy to the individual heating resistive elements $41_1$, $41_2$, .... of the thermal head 1 according to each printing density data item. The amount of energy supplied to the heating resistive elements $41_1$, $41_2$ .... can be changed according to the voltages applied to them and the conducting time.

When a voltage is applied to the parallelogrammic heating resistive elements $41_1$, $41_2$, .... the current distribution in each of the heating resistive elements $41_1$, $41_2$, ... is as shown in FIG. 15, which is obtained by numerical analysis using the boundary element method. In the figure, the black points indicate measuring points, the direction of each line is the current direction at that measuring point, and the length of the line represents the magnitude of current at that measuring point.

As seen from the figure, the current grows greater toward the central portion of the heating resistive element $41_i$. The heat generated at a point within the heating resistive element $41_i$ is proportional to the square of the current at that point. Therefore, the amount of heat generated is greater in the central portion of the heating resistive element $41_i$.

To print a dot on the printing sheet, more than a predetermined amount of heat is necessary. Therefore, the applied voltage to the heating resistive element $41_i$ is low, a dot is printed by the heating of the area indicated by 61a (hereinafter, referred to as the effective heating area) in FIG. 15. As the applied voltage is increased, the effective heating area expands accordingly as shown by 61a and 61c. Thus, by changing the amount of energy applied to the heating resistive element $41_i$, the size of the dot can be changed.

Figure 17:
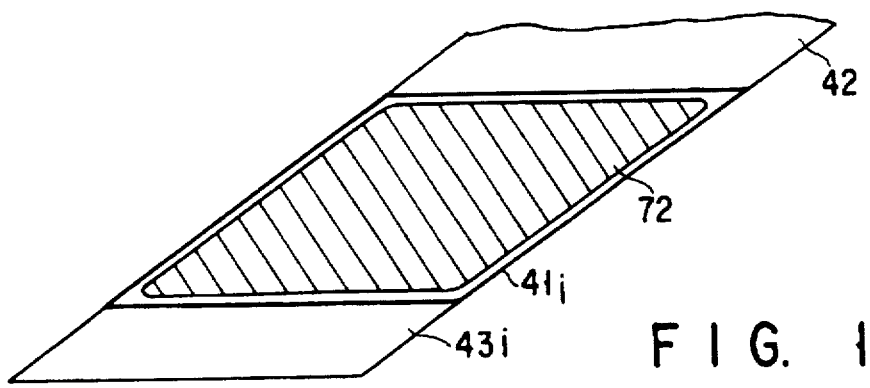
FIG. 17 illustrates the effective heating area of a heating resistive element in forming a printed dot of level 2 in the heat-transfer printing apparatus according to the third embodiment.

In the head driver 27, the amount of energy corresponding to each level is set as follows. Because level 0 is a white level (at this level, no dot is printed), the amount of energy is 0. Level 1 is set at a value required to print as large an effective heating area 71 as the size of a dot of the image, in part of the heating resistive element $41_i$ as shown in FIG. 16. Level 2 is set at a value required to print an effective heating area 72 in the entire area of the heating resistive element $41_i$ as shown in FIG. 17. The amount of energy supplied to the heating resistive element $41_i$ can be changed according to the applied voltage to it and the conducting time.

Figure 18:
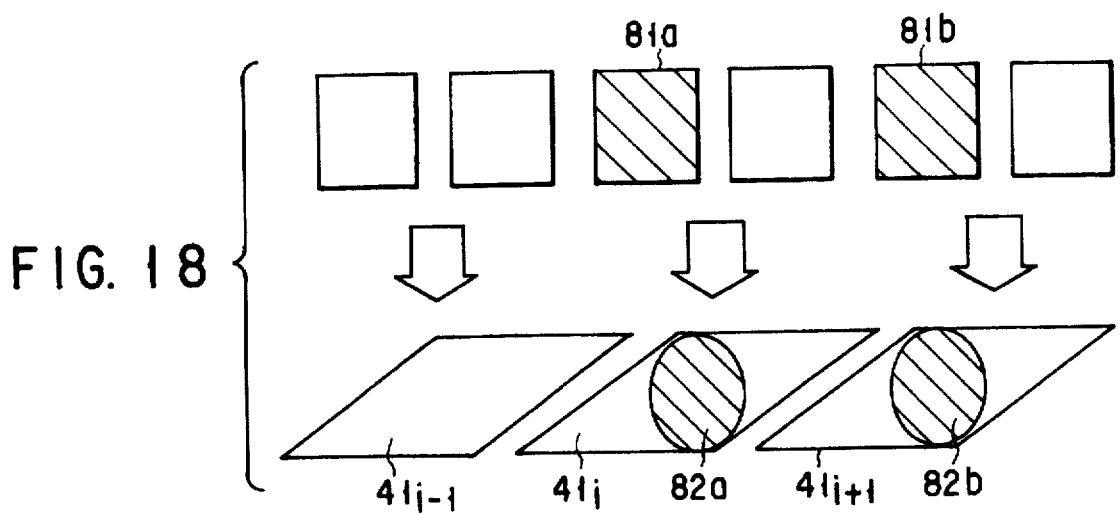
FIG. 18 illustrates the effective heating areas of heating resistive elements when the heat-transfer printing apparatus of the third embodiment prints the original image having a non-statistical characteristic where dots are arranged discretely.

When an image is made up of dots 81a and 81b located discretely as shown at the top of FIG. 18, effective heating areas 82a and 82b whose size corresponds to a dot of the image are printed, as shown at the bottom of FIG. 18, in part of the heating resistive elements $41_i$ and $41_{i+1}$ for which only one of the corresponding two original image data items indicates that a dot is present. Therefore, the dots are printed discretely as the original image data is.

Figure 19:
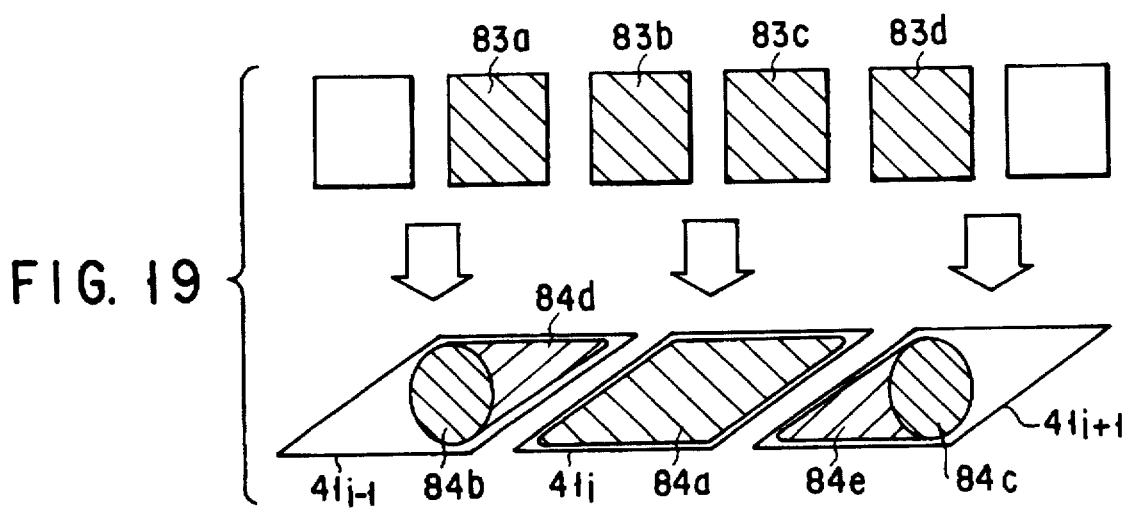
FIG. 19 illustrates the effective heating areas of heating resistive elements when the heat-transfer printing apparatus of the third embodiment prints the original image having a statistical characteristic where dots are arranged in clusters.

On the other hand, when an image is made up of dots 83a, 83b, 83c, and 83d in clusters as shown at the top of FIG. 19, an effective heating area 84a is printed, as shown at the bottom of FIG. 19, in the entire area of the heating resistive element $41_i$ for which both of the corresponding two original image data items indicate that a dot is present. Since at both ends of the image, the same voltage as in FIG. 18 is applied to the heating resistive elements $41_{i-1}$ and $41_{i+1}$ for which only one of the corresponding two original image data items at both ends of the image indicates that a dot is present, the effective heating area printed by the applied voltage is the areas shown by 84b and 84c as in FIG. 18. However, because the effective heating area 84a of the adjacent heating resistive element $41_i$ extends to part of the heating resistive elements $41_{i-1}$ and $41_{i+1}$, effective heating areas 84d and 84e are printed under the influence of the heat from the adjacent heating resistive element $41_i$. As a result, the effective heating areas of the heating resistive elements $41_{i-1}$, $41_i$; $41_i$, $41_{i+1}$ are combined to print a continuous, large black image. Since the effective heating area of the adjacent heating resistive element (not shown) has not extended to the portions corresponding to the outside of the heating resistive elements $41_{i-1}$ and $41_{i+1}$ corresponding to both ends of the image, no effective heating area is printed as shown in FIG. 19. Therefore, as shown in FIG. 19, an image faithful to the image data is printed.

With this embodiment, like the first and the second embodiment, a high-quality image approximating the image indicated by the image data can be printed, although the resolution (in the main scanning direction) achievable by the thermal head 1 is lower than that of the image data. This reduces the number of heating resistive elements in the thermal head 1 and makes its cost lower. Further, because there is no increase in the circuit size of the head driver 27, manufacturing costs can be kept low. The third embodiment can deal with up to n times as high a resolution as the resolution in the main scanning direction of the image data. Further, with this embodiment, by making the heating resistive elements $41_1$, $41_2$, ... of the thermal head 1 parallelogrammic, adjacent dots of an image having a statistical characteristic come to combine with each other as shown in FIG. 19, even if the already determined printing density of the adjacent printing dot is not taken into account in determining the printing density of a dot to be printed unlike the first and the second embodiment. Further, when an image has no statistical characteristic, the image can be printed by discrete dots, as shown in FIG. 18. As a result, both an image having a statistical characteristic such as a character or a line drawing and an image having no statistical characteristic such as a pseudo half-tone image in the error diffusion system, can be printed excellently without specially designing a print density determination circuit.

The shape of the heating resistive elements $41_1$, $41_2$, ... in the third embodiment is not necessarily parallelogrammic in the strict sense of the word. It only has to be almost parallelogrammic. For modifications, the shape may be ecliptic. Further, it is possible to simply arrange rectangular heating resistive elements slantingly. The important point is that there must be overlapping portions with adjacent elements, and the arrangement of the heating resistive elements must be such that as the applied energy is increased, the size of a printed dot increases in the main scanning direction.

FIG. 20 is a top plan view showing a detailed configuration of a thermal head in accordance with a modification of the third embodiment. In FIG. 20, the thermal head comprises an insulating substrate 80 formed of a ceramic, alumina, or the like and heating resistive elements $81_1$, $81_2$, ... arranged in one-dimensionally at regular intervals on the insulating substrate 80 with one end of each of the heating resistive elements $81_1$, $81_2$, ... connected to a common electrode 82 and the other end of each resistive element connected to individual electrodes $83_1$, $83_2$, ... respectively.

FIG. 21 is an enlarged view of the structure of an essential portion of the thermal head shown in FIG. 20. In FIG. 20, a lead of the common electrode 82 and the individual electrodes $83_i$ are disposed at mutually offset positions with respect to the horizontal scanning direction. The heating resistive elements $81_i$ is formed in a region surrounded by two mutually parallel straight lines respectively extending in a direction from the respective one edges (the right-hand edge of the electrodes 82 and $83_i$) of the opposing electrodes 82 and $83_i$ that causes a maximum positional offset in the horizontal scanning direction, and by the other mutually parallel two straight lines diagonally and outwardly extending from the other edges (the left-hand edge of the electrodes 82 and $83_i$) of the opposing electrodes 82 and $83_i$.

As a result, the width of a major portion of the heating resistive elements $81_i$ in the horizontal scanning direction is greater than the widths in the same direction of the electrodes 82 and $83_i$.

If an analysis is made of the configurations shown in FIG. 22, it can be considered that peripheral portions, including the acute angled portions, of the parallelogram indicated by broken lines are partially cut off.

Similarly, with respect to the electrodes 82 and $83_i$, it can be considered that their widths in the horizontal scanning direction are formed in order to conform with the width of the partially cut-off heating resistive element $81_i$.

FIGS. 23A to 23F shows other modifications of the heating resistive elements.

In an example shown in FIG. 23A, a heating resistive element 91a is formed in a region surrounded by two straight lines respectively extending diagonally and outwardly from the opposite edges of a common electrode 92a, and by two straight lines respectively extending diagonally and outwardly from the opposite edges of an individual electrode 93a.

In an example shown in FIG. 23B, a heating resistive element 91b is formed in a region surrounded by two straight lines respectively extending diagonally and inwardly from the one edges of a common electrode 92b and an individual electrode 93b, which causes a maximum positional offset in the horizontal scanning direction, and by other two straight lines respectively extending diagonally and outwardly from the other edges of the common electrode 92b and individual electrode 93b.

In an example shown in FIG. 23C, a heating resistive element 91c is formed in a region surrounded by a straight line connecting one opposing ends of a common electrode 92c and an individual electrode 93c and by two straight lines respectively extending in arbitrary directions from the other edges of the common electrode 92c and individual electrode 93c.

The above examples illustrate configurations in which, with respect to the heating resistive element, acutely-angled portions of the parallelograms indicated by broken lines in the respective drawings are rectilinearly cut off. However, these portions may be partially cut off not by straight lines but by curves.

In an example shown in FIG. 23D, with respect to the configuration of a heating resistive element shown in FIG. 21, sides of a heating resistive element 91d which are defined by mutually parallel two straight lines respectively extending in directions perpendicular to the horizontal scanning direction from the one ends of the opposing common electrode 92a and individual electrode 93a that causes a maximum positional offset in the horizontal scanning direction are cut off in the form of a circular arc from the aforementioned viewpoint.

In contrast, in an example shown in FIG. 23E, with respect to the configuration of a heating resistive element shown in FIG. 21, sides of a heating resistive element 91e which are defined by mutually parallel two straight lines respectively extending in directions perpendicular to the horizontal scanning direction from the one ends of the opposing common electrode 92a and individual electrode 93a that causes a maximum positional offset in the horizontal scanning direction are expanded in the form of a circular arc.

This type of processing into the configuration of a circular arc may also be effected for the heating resistive elements 91a, 91b, and 91c shown in FIGS. 23A to 23C.

For example, in an example shown in FIG. 23F, with respect to the configuration of the heating resistive element shown in FIG. 23C, the sides of a heating resistive element 91f which are defined by the two straight lines respectively extending from the edges of common electrode 92f and individual electrode 93f in arbitrary directions are cut off into the configuration of a circular arc.

The foregoing modifications respectively concern thermal heads in which the widths of the common electrode 92f and individual electrode 93f in the horizontal scanning directions are identical. However, it is possible to provide a thermal head in which the widths of the common electrode 92f and individual electrode 93f in the horizontal scanning directions are different.

FIGS. 24A to 24C are enlarged views respectively illustrating structures of an essential portion of a thermal head in which the width of the common electrode 92f is formed to be greater than the width of the individual electrode 93f with respect to the horizontal scanning direction.

While in the third embodiment, the resolution in the sub-scanning direction is not taken into account as in the first embodiment, differences in the resolution in the sub-scanning direction may also be compensated for by connecting a printing energy determination circuit 31 of FIG. 7 between the printing density determination circuit 25B of the printing processor 20B and the head driver 27, as in the second embodiment.

As has been explained, according to the present invention, it is possible to provide a thermal printing apparatus capable of minimizing the degradation of the quality of an image whose resolution is higher than the printable resolution and achieving excellent printing, while keeping the printable resolution low to prevent a rise in the cost.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above embodiments, a thermal printing apparatus of the invention is applied to a heat-transfer printing apparatus, the present invention may be applied in the same manner to a heat sensitive recording apparatus which uses heat-sensitive recording paper instead of an ink film. Further, the invention may be applied to an electrophotographic recording apparatus such as a laser printer.

What is claimed is:

1. A printing apparatus which prints image data having a specific resolution by means of a printing head whose resolution in a main scanning direction is 1/k (k is a given integer) of that of the image data, said apparatus comprising:

means for extracting k consecutive image data items in the main scanning direction from the image data;

means for determining a printing density of a pixel on the basis of a combination of the k image data items extracted by said extracting means and a printing density of a preceding printed pixel; and means for driving the printing head according to the printing density determined by said determining means.

2. An apparatus according to claim 1, wherein said image data is formed of binary image data items; and said determining means comprises means for converting k image data items into a printing density of (k+1) level.

3. An apparatus according to claim 1, wherein the resolution of said printing head is one-third that of the image data; and said determining means determines the printing density to be 0 (indicating that no dot is printed) when three image data items are all at level 0 (indicating that no dot is printed), the printing density to be 1 (indicating that a dot of a lowest printing density is printed) when the printing density of the preceding printed pixel is any value other than 0 and one of three image data items is at level 1 (indicating that a dot is printed), the printing density to be 2 (indicating that a dot of an intermediate printing density is printed) when the printing density of the preceding printed pixel is 0 and one of three image data items is at level 1, the printing density to be 1 when the printing density of the preceding printed pixel is 3 and discrete two of three image data items are at level 1, the printing density to be 2 when the printing density of the preceding printed pixel is any value other than 3 and discrete two of three image data items are at level 1, the printing density to be 2 when two consecutive ones of three image data items are at level 1, and the printing density to be 3 (indicating that a dot of a highest printing density is printed) when three image data items are all at level 1.

4. An apparatus according to claim 1, wherein said printing head is a thermal printing head.

5. An apparatus according to claim 1, further comprising:

means for printing a two-dimensional image through a relative movement in a sub-scanning direction of a printing head arranged in a main scanning direction and a printing sheet, the printing means being supplied with image data having j pixels per a length of r in the sub-scanning direction of the printing head;

means for supplying to the printing head image data corresponding to 1/j of a printing density corresponding to a line of pixels;

means for relatively moving the printing head and the printing sheet by r/j in the sub-scanning direction for each printing; and means for prohibiting supply of image data by said supplying means if the printing density of the line of pixels has already exceeded a printing density corresponding to the image data at each time of printing for the line of pixels.

6. A printing apparatus for printing image data having a specific resolution, comprising:

a printing head having printing elements arranged in a main scanning direction, the printing elements of the printing head having overlapping portions with areas printed by adjacent printing elements in the main scanning direction, and being arranged so that a size of a printed pixel may change in the main scanning direction as a printing energy changes, and the resolution in the main scanning direction of the printing head being 1/p (p: a given integer) of a resolution in the main scanning direction of the image data;

means for extracting p consecutive image data items in the main scanning direction from the image data;

means for determining the printing density of a pixel printed by a single printing element on the basis of a combination of the p image data items extracted by said extracting means and a printing density of a preceding pixel;

means for applying to the printing head a printing energy corresponding to the printing density determined by said determining means.

7. An apparatus according to claim 6, wherein said printing head is made up of parallelogrammic printing elements arranged at regular intervals.

8. An apparatus according to claim 6, wherein:

said image data is made up of binary image data items; and said determining means comprises means for converting p image data items into a printing density of (p+1)-th value.

9. An apparatus according to claim 6, wherein:

the resolution in the main scanning direction of the printing head is half that of the image data; and said determining means comprises means for determining the printing density to be 0 (indicating that no dot is printed) when two extracted image data items are all at level 0 (indicating that no dot is printed), the printing density to be 1 (indicating that the dots in the central area of the printing element are printed) when one of two extracted image data items is at level 1 (indicating that a dot is printed), and the printing density to be 2 (the dots in the entire area of the printing element are printed) when two extracted image data items are all at level 1.

10. An apparatus according to claim 6, wherein said printing head is a thermal printing head.

11. An apparatus according to claim 6, further comprising:

means for printing a two-dimensional image through a relative movement in a sub-scanning direction of a printing head arranged in a main scanning direction and a printing sheet, the printing means being supplied with image data having j pixels per a length of r in the sub-scanning direction of the printing head;

means for supplying to the printing head image data corresponding to 1/j of a printing density corresponding to a line of pixels;

means for relatively moving the printing head and the printing sheet by r/j in the sub-scanning direction for each printing; and means for prohibiting supply of image data by said supplying means if the printing density of the line of pixels has already exceeded a printing density corresponding to the image data at each time of printing for the line of pixels.

* * * * *